US011343785B2

(12) United States Patent
Zhang

(10) Patent No.: US 11,343,785 B2
(45) Date of Patent: May 24, 2022

(54) UE, BASE STATION, COMMUNICATION NODE, AND METHOD FOR WIRELESS COMMUNICATION WITH IMPROVED MOBILITY AND FLEXIBILITY IMPLEMENTED IN THE UE

(71) Applicant: XiaoBo Zhang, Shanghai (CN)

(72) Inventor: XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 101 days.

(21) Appl. No.: 16/662,044

(22) Filed: Oct. 24, 2019

(65) Prior Publication Data

US 2020/0059877 A1     Feb. 20, 2020

Related U.S. Application Data

(63) Continuation of application No. PCT/CN2017/081176, filed on Apr. 27, 2017.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0048* (2013.01); *H04W 52/04* (2013.01); *H04W 72/12* (2013.01)

(58) Field of Classification Search
CPC ... H04W 56/001; H04W 52/04; H04W 72/12; H04W 72/00; H04L 5/0048;
(Continued)

(56) References Cited

U.S. PATENT DOCUMENTS

2016/0174174 A1    6/2016 Chae et al.
2017/0006508 A1*   1/2017 Moon ............ H04W 36/00837
(Continued)

FOREIGN PATENT DOCUMENTS

CN     103503233 A    1/2014
CN     104025701 A    9/2014
(Continued)

OTHER PUBLICATIONS

Second Office Action received in application No. CN201780089119.2 dated Sep. 8, 2021.
(Continued)

*Primary Examiner* — Kiet Tang

(57) ABSTRACT

The disclosure provides a method and a device in a User Equipment (UE) and a base station for wireless communication. The UE first receives a first radio signal and a second radio signal, and then transmits a third radio signal. The first radio signal is used for determining a first signature sequence, and a receiving timing of the second radio signal is used for determining a transmitting timing of the third radio signal. The first signature sequence is used for generating the third radio signal. The first radio signal and the second radio signal are associated with a first synchronization sequence and a second synchronization sequence respectively, and the first synchronization sequence is different from the second synchronization sequence. According to the disclosure, through the designs of the first radio signal and the second radio signal, thereby improving system performances and transmission efficiency.

8 Claims, 9 Drawing Sheets

(51) Int. Cl.
*H04W 52/04* (2009.01)
*H04W 72/12* (2009.01)

(58) Field of Classification Search
CPC ............. H04L 27/2692; H04L 27/2613; H04L 27/2655; H04L 5/0053; H04L 5/0091; H04L 5/0023; H04L 5/003
See application file for complete search history.

(56) References Cited

U.S. PATENT DOCUMENTS

2017/0127367 A1* 5/2017 Axnas ............... H04W 56/0015
2017/0331670 A1* 11/2017 Parkvall ............ H04W 52/0245

FOREIGN PATENT DOCUMENTS

| CN | 104202712 A | 12/2014 |
|----|-------------|---------|
| CN | 104812057 A | 7/2015 |
| CN | 106465313 A | 2/2017 |

OTHER PUBLICATIONS

Second Office Action received in application No. CN201780089119.2 dated Aug. 31, 2021.
ISR received in application No. PCT/CN2017/081176 dated Jan. 3, 2018.
CN201780089119.2 1st Office Action dated Mar. 25, 2021.
CN201780089119.2 First Search Report dated Mar. 17, 2021.

* cited by examiner

UE, BASE STATION, COMMUNICATION NODE, AND METHOD FOR WIRELESS COMMUNICATION WITH IMPROVED MOBILITY AND FLEXIBILITY IMPLEMENTED IN THE UE

CROSS-REFERENCE TO RELATED APPLICATION

This application is a continuation of International Application No. PCT/CN2017/081176, filed Apr. 27, 2017, the full disclosure of which is incorporated herein by reference.

BACKGROUND

Technical Field

The disclosure relates to transmission methods and devices in wireless communication systems, and in particular to a method and a device for communication between an air terminal and a ground device.

Related Art

In the 3rd Generation Partner Project (3GPP) R12, Device to Device (D2D) communication is approved and discussed. The nature of the D2D is to allow data transmission between User Equipments (UEs). In conventional D2D communication, considering the robustness of D2D transmission and interferences to cellular communication, when a D2D UE is in coverage, transmissions of the D2D UE on both sidelink and cellular link are controlled by a serving cell corresponding to the D2D UE.

In discussions about 5G in 3GPPP, a Study Item (SI) of Enhanced Support for Aerial Vehicles has been approved and discussed in 3GPP. One feature of air communication is that transmissions of one air terminal device would be detected by multiple base stations, correspondingly, the transmission method between the air terminal and ground terminal needs to be reconsidered.

SUMMARY

One important feature of air communication is that a terminal located in air, after reaching a certain height, generally has a Line of Sight (LOS) to a ground terminal and a base station. Due to reasons of LOS, when an air terminal in a target cell communicates with a ground terminal corresponding to the air terminal or a base station corresponding to the target cell, ground terminals in neighbor cells of the target cell and base stations corresponding to the neighbor cells can both receive signals coming from the air terminal, thereby causing large inter-cell interferences.

In current LTE D2D application scenarios, no matter the receiving object is a base station, or the receiving object is an opposite-end UE of a D2D transmitting terminal, transmissions of the D2D transmitting terminal are all controlled by a serving cell of the transmitting terminal. The above method is to ensure that the transmissions of the D2D transmitting terminal do not cause interferences to cellular links. Communications between an air terminal and a ground terminal in air communication to a great extent will inherit transport protocols of LTE D2D communication. Meanwhile, in discussions of Vehicle to X (V2X) evolution based on D2D in Release 14, synchronization of the Global Navigation Satellite System (GNSS) is also introduced to the synchronization applications between D2D pair. In view of the feature that transmissions of an air terminal may be received by base stations corresponding to multiple ground cells and the feature that an air terminal is easier to synchronize with the GNSS, a new transmission method based on air terminal needs to be considered.

In view of the above problems, the disclosure provides a solution. It should be noted that the embodiments of the disclosure and the characteristics in the embodiments may be mutually combined arbitrarily if no conflict is incurred. For example, the embodiments of the UE of the disclosure and the characteristics in the embodiments may be applied to the base station, and vice versa.

The disclosure provides a method in a UE for wireless communication, wherein the method includes:
  receiving a first radio signal;
  receiving a second radio signal; and
  transmitting a third radio signal.

Herein, the first radio signal is used for determining a first signature sequence, and a receiving timing of the second radio signal is used for determining a transmitting timing of the third radio signal; the first signature sequence is used for generating the third radio signal; the first radio signal and the second radio signal are associated with a first synchronization sequence and a second synchronization sequence respectively, and the first synchronization sequence is different from the second synchronization sequence.

In one embodiment, the above method is characterized in that: a transmitter of the first radio signal is different from a transmitter of the second radio signal, and the UE acquires generation indicators of timing and synchronization sequence from the two transmitters respectively.

In one embodiment, the above method has the following benefits: since an air terminal has an LOS to a ground base station or terminal, the air terminal communicates simultaneously with two ground devices, one of which is used for synchronization while the other is used for transmitting control information. The above method enables a more flexible transmission between the air terminal and the ground terminal, without transmitting all information of the air terminal through a serving cell, thereby avoiding the problem of frequent switching of the air terminal.

In one embodiment, the above method is further characterized in that: in present V2X design, when a synchronization source of the D2D device is the GNSS, a Sidelink Synchronization Sequence Identifier (SLSSID) of the D2D device used for generating a signature sequence of a synchronization sequence is fixed. In the above method, when the third radio signal is applied to an opposite-end device of the air device to perform synchronization and the second radio signal is a signal coming from the GNSS, the first signature sequence is configurable. The above method improves the flexibility of the system, thereby being easier to distinguish synchronization signals coming from different air devices.

In one embodiment, the above method is further characterized in that: when the third radio signal is used for at least one of Transmission Power Control (TPC), triggering the UE to transmit a reference signal, or triggering the UE to transmit channel state information, the transmission of the third radio signal triggers a cell other than the transmitter of the first radio signal and the transmitter of the second radio signal, thus, when an air terminal moves out of a serving cell, any one cell in the coverage of the air terminal supports transmission of non-scheduling control signalings to the air terminal, thereby further improving the mobility of the air terminal and increasing the flexibility of the system. Herein, all ground devices in the coverage can successfully detect signals transmitted from the air terminal.

In one embodiment, the first radio signal and the second radio signal are transmitted on one same carrier.

In one embodiment, the first radio signal and the second radio signal are transmitted by a first transmitter and a second transmitter respectively. The first transmitter is associated with the first synchronization sequence, and the second transmitter is associated with the second synchronization sequence.

In one subembodiment, the first synchronization sequence corresponds to a first target identifier, the second synchronization sequence corresponds to a second target identifier, and the first target identifier is different from the second target identifier.

In one affiliated embodiment of the above subembodiment, the first target identifier is a Physical Cell Identifier (PCI).

In one affiliated embodiment of the above subembodiment, the second target identifier is a Physical Cell Identifier (PCI), or the second target identifier is a UE ID.

In one subembodiment, the first transmitter is one cell, and the second transmitter is one cell.

In one affiliated embodiment of the above subembodiment, the first transmitter is a serving cell corresponding to the UE.

In one affiliated embodiment of the above subembodiment, the second transmitter is a serving cell corresponding to the UE.

In one subembodiment, the first radio signal indicates a first identifier, and the first identifier is used for generating the first signature sequence.

In one affiliated embodiment of the above subembodiment, the first identifier is an SLSSID.

In one affiliated embodiment of the above subembodiment, the first identifier is an integer not less than 0 but not greater than 167.

In one affiliated embodiment of the above subembodiment, the first radio signal includes an SL-SyncConfig IE (Information Element) in TS 36.331.

In one subembodiment, the first transmitter is a cell, and the second transmitter is a target terminal.

In one affiliated embodiment of the above subembodiment, the first transmitter is a serving cell corresponding to the UE.

In one affiliated embodiment of the above subembodiment, the target terminal is an opposite-end terminal of the UE.

In one affiliated embodiment of the above subembodiment, the target terminal and the UE form a D2D pair.

In one affiliated embodiment of the above subembodiment, the first transmitter is a serving cell of the target terminal.

In one affiliated embodiment of the above subembodiment, the target terminal is a terminal used for terrestrial radio access.

In one embodiment, a receiving timing of the first radio signal is also used for determining the transmitting timing of the third radio signal.

In one embodiment, the first radio signal indicates a first identifier, and the first identifier is used for generating the first signature sequence.

In one embodiment, the first radio signal is generated by a target signature sequence, and the target signature sequence is equal to the first signature sequence.

In one embodiment, a target radio signal includes at least one of a Primary Synchronization Signal (PSS), a Secondary Synchronization Signal (SSS), a Primary Sidelink Synchronization Signal (PSSS) or a Secondary Sidelink Synchronization Signal (SSSS). The target radio signal is one of the first radio signal or the second radio signal.

In one embodiment, a target radio signal includes at least one of a Common Reference Signal (CRS), a Mobility Reference Signal (MRS), a Phase Tracking Reference Signal (PTRS), a Channel State Information-Reference Signal (CRS-RS), a Demodulation Reference Signal (DMRS), a Discovery Reference Signal (DRS) or a NarrowBand Reference Signal (NRS). The target radio signal is one of the first radio signal or the second radio signal.

In one embodiment, a physical layer channel corresponding to the second radio signal is one of a Physical Sidelink Shared Channel (PSSCH), a Physical Sidelink Control Channel (PSCCH), a Physical Sidelink Discovery Channel (PSDCH) or a Physical Sidelink Broadcasting Channel (PSBCH).

In one embodiment, the third radio signal includes at least one of a PSSS, an SSSS, a Sounding Reference Signal (SRS) or an uplink DMRS.

In one embodiment, a physical layer channel corresponding to the third radio signal is one of a Physical Uplink Shared Channel (PUSCH), a Physical Uplink Control Channel (PUCCH), a New Radio PUSCH (N-PUSCH) or a New Radio PUCCH (N-PUCCH).

In one embodiment, a first transmitter transmits the first radio signal, a second transmitter transmits the second radio signal, the first transmitter includes one or more satellites, and the second transmitter is one cell.

In one subembodiment, the first transmitter is a GNSS.

In one subembodiment, a given SLSSID is used for initializing a generator of the first signature sequence, and the given SLSSID is equal to 0.

In one embodiment, a first transmitter transmits the first radio signal, a second transmitter transmits the second radio signal, the first transmitter is one cell, and the second transmitter includes one or more satellites.

In one subembodiment, the second transmitter is a GNSS.

In one embodiment, the first radio signal is generated after the first synchronization sequence is processed in sequence through a resource element mapper and an Orthogonal Frequency Division Multiplexing (OFDM) symbol generator.

In one embodiment, the second radio signal is generated after the second synchronization sequence is processed in sequence through a resource element mapper and an OFDM symbol generator.

In one embodiment, the first radio signal is generated after the first synchronization sequence is processed in sequence through precoding, a resource element mapper and an OFDM symbol generator.

In one embodiment, the second radio signal is generated after the second synchronization sequence is processed in sequence through precoding, a resource element mapper and an OFDM symbol generator.

In one embodiment, the first radio signal includes a given physical layer signaling, and a DCI format corresponding to the given physical layer signaling is one of DCI Formats 3, 3A or 3B.

In one embodiment, the cell in the disclosure corresponds to one LTE cell.

In one embodiment, the cell in the disclosure corresponds to one 5G cell.

In one embodiment, the cell in the disclosure corresponds to one 5G base station.

In one embodiment, the cell in the disclosure corresponds to one 5G Transmission Reception Point (TRP).

In one embodiment, a receiver of the third radio signal includes at least the former one of a target base station or a ground terminal.

In one subembodiment, the target base station includes a serving cell of the user terminal.

In one subembodiment, the ground terminal and the UE share one same serving cell.

In one embodiment, the first radio signal is used for determining a first identifier, the first identifier is used for initializing a generator of the first signature sequence, the third radio signal corresponds to a PSSS, the first identifier corresponds to $N_{ID}^{SL}$ in TS 36.211, and the first signature sequence corresponds to $d_i(n)$ in Chapter 9.7.1 in TS 36.211.

In one embodiment, the first radio signal is used for determining a first identifier, the first identifier is used for initializing a generator of the first signature sequence, the third radio signal corresponds to an SSSS, the first identifier corresponds to $N_{ID}^{SL}$ in TS 36.211, and the first signature sequence corresponds to $d_i(n)$ in Chapter 9.7.2 in TS 36.211.

In one embodiment, the first radio signal is used for determining a first identifier, the first identifier is used for initializing a generator of the first signature sequence, the third radio signal includes an SRS, and the first identifier corresponds to $n_{ID}^{RS}$ in TS 36.211.

In one embodiment, the phrase that a receiving timing of the second radio signal is used for determining a transmitting timing of the third radio signal refers that: the UE selects a transmitter of the second radio signal as a synchronization reference source.

In one embodiment, the phrase that a receiving timing of the second radio signal is used for determining a transmitting timing of the third radio signal refers that: the UE selects a transmitter of the second radio signal as a synchronization reference source, and employs the second radio signal as a timing reference of the third radio signal.

According to one aspect of the disclosure, the method includes:

monitoring K downlink signalings.

Herein, the downlink signaling is a physical layer signaling, and the K downlink signalings are associated with K synchronization sequences respectively; any two of the K synchronization sequences are different; the K is a positive integer greater than 1; the second synchronization sequence is one of the K synchronization sequences; the K downlink signalings are identified by a first index respectively, and the first index is an integer.

In one embodiment, the above method is characterized in that: the UE monitors downlink signalings from multiple cells, so that the multiple cells can perform non-scheduling physical layer control on the UE simultaneously, thereby optimizing the mobility of the UE and the design flexibility of the system.

In one embodiment, the first index is a Cell Radio Network Temporary Identifier (C-RNTI).

In one embodiment, the downlink signaling is Downlink Control Information (DCI).

In one subembodiment, the K downlink signalings include K Cyclic Redundancy Check (CRC) parts respectively, and the K CRC parts are scrambled with the first index respectively.

In one embodiment, a physical layer identifier corresponding to the synchronization sequence is used for generating a scrambling sequence, and the scrambling sequence is used for scrambling of an associated downlink signaling.

In one subembodiment, the physical layer identifier is one PCI.

In one embodiment, the K synchronization sequences identify K cells respectively.

In one embodiment, the K downlink signalings are transmitted by K cells respectively, and the K cells are associated with the K synchronization sequences respectively.

In one subembodiment of the above two embodiments, the K cells are serving cells of the UE.

In one subembodiment of the above two embodiments, the first transmitter in the disclosure is one of the K cells.

In one subembodiment of the above two embodiments, the second transmitter in the disclosure is one of the K cells.

In one subembodiment of the above two embodiments, the K cells belong to a target cell group.

In one affiliated embodiment of the above subembodiment, any two cells in the target cell group have a backhaul link therebetween.

In one affiliated embodiment of the above subembodiment, all cells in the target cell group are Quasi Co-Located (QCLed) for the UE.

In an example of the above affiliated embodiment, the phrase that a given cell and a target cell are QCLed for the UE refers that: the UE can deduce large-scale properties of channels of radio signals transmitted by the target cell from large-scale properties of channels of radio signals transmitted from the given cell. The large-scale properties include one or more of delay spread, Doppler spread, Doppler shift, average gain, average delay, angle of arrival or angle of departure.

In one affiliated embodiment of the above subembodiment, the UE and all cells in the target cell group share one same Timing Advance (TA).

In one affiliated embodiment of the above subembodiment, the UE realizes uplink synchronization with any cell in the target cell group, and the UE considers that the UE realizes uplink synchronization with all cells in the target cell group.

In one embodiment, the UE monitors the K downlink signalings on one same carrier.

In one subembodiment, the monitoring refers that the UE determines the K downlink signalings through a blind decoding method.

In one embodiment, the UE blind decodes the K downlink signalings in K search spaces respectively.

In one embodiment, the UE blind decodes the K downlink signalings in K time-frequency resource sets respectively.

In one subembodiment, the time-frequency resource set includes a positive integer number of Resource Elements (REs).

In one subembodiment, the K time-frequency resource sets include two time-frequency resource sets which share one same RE.

In one subembodiment, the time-frequency resource set includes a positive integer number of Control Resource Sets (CORESETs).

In one embodiment, the synchronization sequence includes at least one of a pseudorandom sequence or a Zadoff-Chu sequence.

In one embodiment, the synchronization signal corresponds to a New Radio PSS (NR-PSS), and the synchronization sequence is a pure BPSK M sequence with a length of 127.

In one subembodiment, the NR-PSS is generated through one polynomial, and the polynomial corresponds to decimal 145.

In one affiliated embodiment of the above subembodiment, the phrase that the polynomial corresponds to decimal 145 refers that the polynomial is $g(x)=x7+x4+1$.

In one subembodiment, the NR-PSS frequency-domain obtains three PSS signals through three cyclic shifts (0, 43, 86).

In one subembodiment, an initial Poly Shift Register Value of the NR-PSS is binary 1110110.

According to one aspect of the disclosure, the above method includes:

monitoring a first signaling.

Herein, the first synchronization sequence is one of the K synchronization sequences, and the UE assumes that only the first synchronization sequence among the K synchronization sequences is associated with the first signaling; a format of the first signaling is any one candidate format in a format set; and the format set includes a positive integer number of candidate formats.

In one embodiment, the above method is characterized in that: the first signaling is used for transmitting schedulings of data communication between the UE and a serving cell of the UE; or the first signaling is used for transmitting configurations of a control channel between the UE and a serving cell of the UE.

In one embodiment, the phase that the UE assumes that only the first synchronization sequence among the K synchronization sequences is associated with the first signaling refers that: the user terminal descrambles the first signaling using one scrambling sequence only, and only the first synchronization sequence among the K synchronization sequences is used for generating the scrambling sequence.

In one embodiment, the UE assumes that a transmitter of the first signaling and a transmitter of the first radio signal are one same cell, and the cell is a serving cell of the UE.

In one embodiment, the phase that the UE assumes that only the first synchronization sequence among the K synchronization sequences is associated with the first signaling refers that: only the first synchronization sequence among the K synchronization sequences shares one transmitter with the first signaling.

In one embodiment, the phase that only the first synchronization sequence among the K synchronization sequences is associated with the first signaling refers that: only the first synchronization sequence among the K synchronization sequences shares a unique given identifier with the first signaling.

In one subembodiment, the given identifier is used for initializing a generator of the first synchronization sequence.

In one subembodiment, the given identifier is used for scrambling of a CRC of the first signaling.

In one subembodiment, the given identifier is one PCI.

In one embodiment, the format set includes a DCI Format 5.

In one embodiment, the format set includes a DCI Format 5A.

In one embodiment, the format set includes at least one of a first format or a second format. The first format is an uplink grant DCI, and the second format is a downlink grant DCI.

In one subembodiment, the uplink grant DCI includes DCI formats 0, 4, 4A or 4B.

In one subembodiment, the downlink grant DCI includes DCI formats 1, 1A, 1B, 1C, 1D, 2, 2A, 2B, 2C, 2D.

According to one aspect of the disclosure, the method includes:

transmitting a fourth radio signal.

Herein, the first signaling is used for determining scheduling information of the fourth radio signal; and the scheduling information includes at least one of occupied time-domain resources, occupied frequency-domain resources, a Modulation and Coding Status (MCS), a New Data Indicator (NDI), a Redundancy Version (RV), or a Hybrid Automatic Repeat reQuest (HARQ) process number.

In one embodiment, the above method is characterized in that: the fourth radio signal is a data channel scheduled by the first signaling; or the fourth radio signal is a control channel configured by the first signaling.

In one embodiment, the Modulation and Coding Status is abbreviated to MCS.

In one embodiment, the New Data Indicator is abbreviated to NDI.

In one embodiment, the Redundancy Version is abbreviated to RV.

In one embodiment, the Hybrid Automatic Repeat reQuest is abbreviated to HARQ.

In one embodiment, the first signaling is a higher-layer signaling, and the fourth radio signal is transmitted on a Physical Sidelink Control Channel (PSCCH).

In one embodiment, the first signaling is a higher-layer signaling, and the fourth radio signal is transmitted on one of a PUCCH or an N-PUCCH.

In one embodiment, the first signaling is a higher-layer signaling, and the fourth radio signal is transmitted on a Physical Sidelink Shared Channel (PSSCH).

In one embodiment, the first signaling is a higher-layer signaling, and the fourth radio signal is transmitted on one of a PUSCH or an N-PUSCH.

In one subembodiment of the above two embodiments, the physical layer signaling is a DCI.

In one subembodiment of the above two embodiments, the physical layer signaling is an SCI.

According to one aspect of the disclosure, the method includes:

receiving a second signaling.

Herein, the second signaling is used for determining K time-frequency resource sets or the K synchronization sequences or both; the second signaling is associated with the first synchronization sequence; the first radio signal indicates a first identifier, and the first identifier is used for generating the first signature sequence.

In one embodiment, the above method is characterized in that: the second signaling is used for configuring the K time-frequency resource sets, and is used for configuring the K synchronization sequences. The above method increases the flexibility of the system.

In one embodiment, the UE monitors the K downlink signalings in the K time-frequency resource sets respectively.

In one embodiment, a transmitter of the second signaling is a serving cell of the UE.

In one embodiment, the first synchronization sequence is one of the K synchronization sequences.

In one embodiment, the second signaling is a higher-layer signaling.

In one subembodiment, the higher-layer signaling is a Radio Resource Control (RRC) signaling.

In one subembodiment, the higher-layer signaling is UE-specific.

In one subembodiment, the higher-layer signaling is cell-specific.

In one subembodiment, a physical layer identifier corresponding to the first synchronization sequence is used for generating a first scrambling sequence, the first scrambling sequence is used for scrambling of a second physical layer signaling, and the second physical layer signaling is used for determining time-frequency resources occupied by the second signaling.

In one affiliated embodiment of the above subembodiment, the physical layer identifier is one PCI.

In one embodiment, a transmitter of the second signaling is a terminal.

In one embodiment, a transmitter of the second signaling is a transmitter of the first radio signal.

In one embodiment, the first identifier is an integer not less than 0 but not greater than 167.

In one embodiment, the first identifier belongs to a given identifier set, and the given identifier set includes a positive integer number of identifiers.

In one subembodiment, the second signaling indicates the given identifier set.

In one subembodiment, a higher-layer signaling indicates the given identifier set.

In one subembodiment, the first radio signal is used for determining the first identifier from the given identifier set.

In one subembodiment, the K synchronization sequences correspond to K nodes respectively, and the K nodes share the given identifier set.

In one affiliated embodiment of the subembodiment, the K nodes correspond to K cells respectively, and the first identifier corresponds to the UE uniquely among terminals served by the K cells.

In one affiliated embodiment of the subembodiment, the K nodes correspond to transmitters of the K downlink signalings respectively.

According to one aspect of the disclosure, the method includes:

transmitting a fifth radio signal.

Herein, a receiving timing of the first radio signal is used for determining a transmitting timing of the fifth radio signal, and the first signature sequence is used for generating the fifth radio signal.

In one embodiment, the above method is characterized in that: when the UE does not receive the second radio signal, the UE takes a receiving timing of the first radio signal as a transmitting timing.

In one embodiment, the fifth radio signal includes at least one of a PSSS, an SSSS, an SRS or an uplink DMRS.

In one embodiment, a physical layer channel corresponding to the fifth radio signal is one of a PUSCH, a PUCCH, an N-PUSCH or an N-PUCCH.

In one embodiment, a receiver of the fifth radio signal includes at least the former one of a target base station or a ground terminal.

In one embodiment, the first radio signal is used for determining a first identifier, the first identifier is used for initializing a generator of the first signature sequence, the fifth radio signal corresponds to a PSSS, the first identifier corresponds to $N_{ID}^{SL}$ in TS 36.211, and the first signature sequence corresponds to $d_i(n)$ in Chapter 9.7.1 in TS 36.211.

In one embodiment, the first radio signal is used for determining a first identifier, the first identifier is used for initializing a generator of the first signature sequence, the fifth radio signal corresponds to an SSSS, the first identifier corresponds to $N_{ID}^{SL}$ in TS 36.211, and the first signature sequence corresponds to $d_i(n)$ in Chapter 9.7.2 in TS 36.211.

In one embodiment, the first radio signal is used for determining a first identifier, the first identifier is used for initializing a generator of the first signature sequence, the fifth radio signal includes an SRS, and the first identifier corresponds to $n_{ID}^{SL}$ in TS 36.211.

According to one aspect of the disclosure, the downlink signaling is used for at least one of Transmission Power Control (TPC), triggering the UE to transmit a reference signal, or triggering the UE to transmit channel state information.

In one embodiment, the Transmission Power Control is abbreviated to PTC.

In one embodiment, the reference signal includes an SRS.

In one embodiment, the Channel State information is abbreviated to CSI.

In one embodiment, the channel state information includes at least one of a Channel Quality Indicator (CQI), a Precoding Matrix Indicator (PMI), an Rank Indicator (RI) or a CSI-RS Resource Indicator (CRI).

In one embodiment, a given downlink signaling is used for at least one of a TPC of the UE, triggering the UE to transmit a reference signal, or triggering the UE to transmit channel state information, and the given downlink signaling is one of the K downlink signalings.

In one subembodiment, a transmitter of the given downlink signaling is different from a transmitter of the first signaling.

In one subembodiment, a transmitter of the given downlink signaling is the same as a transmitter of the first signaling.

In one subembodiment, a transmitter of the given downlink signaling is a cell other than a serving cell of the UE.

The disclosure provides a method in a base station for wireless communication, wherein the method includes:

transmitting a first radio signal.

Herein, the first radio signal is used for determining a first signature sequence, and a receiving timing of a second radio signal is used for determining a transmitting timing of a third radio signal; the first signature sequence is used for generating the third radio signal; the first radio signal and the second radio signal are associated with a first synchronization sequence and a second synchronization sequence respectively, and the first synchronization sequence is different from the second synchronization sequence.

In one embodiment, the base station is a serving cell of a transmitter of the third radio signal.

According to one aspect of the disclosure, the method includes:

receiving a third radio signal.

According to one aspect of the disclosure, the method includes:

transmitting a first downlink signaling.

Herein, the first downlink signaling is a physical layer signaling, and K downlink signalings are associated with K synchronization sequences respectively; any two of the K synchronization sequences are different; the K is a positive integer greater than 1; the second synchronization sequence is one of the K synchronization sequences; the K downlink signalings are identified by a first index respectively, and the first index is an integer; and the first downlink signaling is one of the K downlink signalings.

According to one aspect of the disclosure, the method includes:

transmitting a first signaling.

Herein, the first synchronization sequence is one of the K synchronization sequences, and only the first synchronization sequence among the K synchronization sequences is associated with the first signaling; a format of the first signaling is any one candidate format in a format set; and the format set includes a positive integer number of candidate formats.

According to one aspect of the disclosure, the method includes:

receiving a fourth radio signal.

Herein, the first signaling is used for determining scheduling information of the fourth radio signal; and the scheduling information includes at least one of occupied time-domain resources, occupied frequency-domain resources, an MCS, an NDI, an RV, or a HARQ process number.

According to one aspect of the disclosure, the method includes:

transmitting a second signaling.

Herein, the second signaling is used for determining K time-frequency resource sets or the K synchronization sequences or both; the second signaling is associated with the first synchronization sequence; the first radio signal indicates a first identifier, and the first identifier is used for generating the first signature sequence.

According to one aspect of the disclosure, the method includes:

receiving a fifth radio signal.

Herein, a receiving timing of the first radio signal is used for determining a transmitting timing of the fifth radio signal, and the first signature sequence is used for generating the fifth radio signal.

According to one aspect of the disclosure, the above method is characterized in that: the downlink signaling is used for at least one of TPC, triggering a transmitter of the third radio signal to transmit a reference signal, or triggering a transmitter of the third radio signal to transmit channel state information.

The disclosure provides a method in a communication node for wireless communication, wherein the method includes:

transmitting a second radio signal.

Herein, a receiving timing of the second radio signal is used for determining a transmitting timing of a third radio signal; a first signature sequence is used for generating the third radio signal; a first radio signal is used for determining the first signature sequence; the first radio signal and the second radio signal are associated with a first synchronization sequence and a second synchronization sequence respectively, and the first synchronization sequence is different from the second synchronization sequence.

In one embodiment, the communication node is a GNSS.

In one embodiment, the communication node includes one or more satellites.

In one embodiment, the second radio signal is a Global Positioning System (GPS) signal.

In one embodiment, the communication node is one cell.

In one embodiment, the communication node is one terminal.

According to one aspect of the disclosure, the method includes:

receiving a third radio signal.

In one embodiment, when the communication node is one terminal, the communication node receives the third radio signal.

The disclosure provides a UE for wireless communication, wherein the UE includes:

a first transceiver, to receive a first radio signal;
a first receiver, to receive a second radio signal; and
a first transmitter, to transmit a third radio signal.

Herein, the first radio signal is used for determining a first signature sequence, and a receiving timing of the second radio signal is used for determining a transmitting timing of the third radio signal; the first signature sequence is used for generating the third radio signal; the first radio signal and the second radio signal are associated with a first synchronization sequence and a second synchronization sequence respectively, and the first synchronization sequence is different from the second synchronization sequence.

In one embodiment, the above UE for wireless communication is characterized in that: the first transceiver further monitors K downlink signalings; the downlink signaling is a physical layer signaling, and the K downlink signalings are associated with K synchronization sequences respectively; any two of the K synchronization sequences are different; the K is a positive integer greater than 1; the second synchronization sequence is one of the K synchronization sequences; the K downlink signalings are identified by a first index respectively, and the first index is an integer.

In one embodiment, the above UE for wireless communication is characterized in that: the first transceiver further monitors a first signaling; the first synchronization sequence is one of the K synchronization sequences, and the UE assumes that only the first synchronization sequence among the K synchronization sequences is associated with the first signaling; a format of the first signaling is any one candidate format in a format set; and the format set includes a positive integer number of candidate formats.

In one embodiment, the above UE for wireless communication is characterized in that: the first transceiver further transmits a fourth radio signal; the first signaling is used for determining scheduling information of the fourth radio signal; and the scheduling information includes at least one of occupied time-domain resources, occupied frequency-domain resources, an MCS, an NDI, an RV, or a HARQ process number.

In one embodiment, the above UE for wireless communication is characterized in that: the first transceiver further receives a second signaling; the second signaling is used for determining K time-frequency resource sets or the K synchronization sequences or both; the second signaling is associated with the first synchronization sequence; the first radio signal indicates a first identifier, and the first identifier is used for generating the first signature sequence.

In one embodiment, the above UE for wireless communication is characterized in that: the first transceiver further transmits a fifth radio signal; a receiving timing of the first radio signal is used for determining a transmitting timing of the fifth radio signal, and the first signature sequence is used for generating the fifth radio signal.

In one embodiment, the above UE for wireless communication is characterized in that: the downlink signaling is used for at least one of TPC, triggering the UE to transmit a reference signal, or triggering the UE to transmit channel state information.

The disclosure provides a base station for wireless communication, wherein the base station includes:

a second transceiver, to transmit a first radio signal.

Herein, the first radio signal is used for determining a first signature sequence, and a receiving timing of a second radio signal is used for determining a transmitting timing of a third radio signal; the first signature sequence is used for generating the third radio signal; the first radio signal and the second radio signal are associated with a first synchronization sequence and a second synchronization sequence respectively, and the first synchronization sequence is different from the second synchronization sequence.

In one embodiment, the above base station for wireless communication includes:

a second receiver, to receive a third radio signal.

In one embodiment, the above base station for wireless communication is characterized in that: the second transceiver further transmits a first downlink signaling; the first downlink signaling is a physical layer signaling, and K downlink signalings are associated with K synchronization sequences respectively; any two of the K synchronization sequences are different; the K is a positive integer greater than 1; the second synchronization sequence is one of the K synchronization sequences; the K downlink signalings are identified by a first index respectively, and the first index is an integer; and the first downlink signaling is one of the K downlink signalings.

In one embodiment, the above base station for wireless communication is characterized in that: the second transceiver further transmits a first signaling; the first synchronization sequence is one of the K synchronization sequences, and only the first synchronization sequence among the K synchronization sequences is associated with the first signaling; a format of the first signaling is any one candidate format in a format set; and the format set includes a positive integer number of candidate formats.

In one embodiment, the above base station for wireless communication is characterized in that: the second transceiver further receives a fourth radio signal; the first signaling is used for determining scheduling information of the fourth radio signal; and the scheduling information includes at least one of occupied time-domain resources, occupied frequency-domain resources, an MCS, an NDI, an RV, or a HARQ process number.

In one embodiment, the above base station for wireless communication is characterized in that: the second transceiver further transmits a second signaling; the second signaling is used for determining K time-frequency resource sets or the K synchronization sequences or both; the second signaling is associated with the first synchronization sequence; the first radio signal indicates a first identifier, and the first identifier is used for generating the first signature sequence.

In one embodiment, the above base station for wireless communication is characterized in that: the second transceiver further receives a fifth radio signal; a receiving timing of the first radio signal is used for determining a transmitting timing of the fifth radio signal, and the first signature sequence is used for generating the fifth radio signal.

In one embodiment, the above base station for wireless communication is characterized in that: the downlink signaling is used for at least one of TPC, triggering a transmitter of the third radio signal to transmit a reference signal, or triggering a transmitter of the third radio signal to transmit channel state information.

The disclosure provides a communication node for wireless communication, wherein the communication node includes:

a third transceiver, to transmit a second radio signal.

Herein, a receiving timing of the second radio signal is used for determining a transmitting timing of a third radio signal; a first signature sequence is used for generating the third radio signal; a first radio signal is used for determining the first signature sequence; the first radio signal and the second radio signal are associated with a first synchronization sequence and a second synchronization sequence respectively, and the first synchronization sequence is different from the second synchronization sequence.

In one embodiment, the above communication node for wireless communication is characterized in that: the third transceiver further receives a third radio signal.

In one embodiment, the above communication node for wireless communication is characterized in that: the communication node is a GNSS.

In one embodiment, the above communication node for wireless communication is characterized in that: the communication node includes one or more satellites.

In one embodiment, the above communication node for wireless communication is characterized in that: the second radio signal is a GPS signal.

In one embodiment, the above communication node for wireless communication is characterized in that: the communication node is one cell.

In one embodiment, the above communication node for wireless communication is characterized in that: the communication node is one terminal.

In one embodiment, compared with the prior art, the disclosure has the following advantages.

According to the design in the disclosure, a transmitter of the first radio signal is different from a transmitter of the second radio signal, and the UE acquires generation indicators of timing and synchronization sequence from the two transmitters respectively. When the disclosure is applied to an air terminal, the air terminal communicates simultaneously with two ground devices, one of which is used for synchronization while the other is used for transmitting control information. The above method enables a more flexible transmission between the air terminal and the ground terminal, without transmitting all information of the air terminal through a serving cell, thereby avoiding the problem of frequent switching of the air terminal.

In present V2X design, when a synchronization source of the D2D device is GNSS, an SLSSID of the D2D device used for generating a signature sequence of a synchronization sequence is fixed. In the above method, when the third radio signal is applied to an opposite-end device of the air device to perform synchronization and the second radio signal is a signal coming from the GNSS, the first signature sequence is configurable. The above method improves the flexibility of the system, thereby being easier to distinguish synchronization signals coming from different air devices.

Through the design of the third radio signal, when the third radio signal is used for at least one of TPC, triggering the UE to transmit a reference signal, or triggering the UE to transmit channel state information, the transmission of the third radio signal triggers a cell other than the transmitter of the first radio signal and the transmitter of the second radio signal, thus, when an air terminal moves out of a serving cell, any one cell in the coverage of the air terminal supports transmission of non-scheduling control signalings to the air terminal, thereby further improving the mobility of the air terminal and increasing the flexibility of the system.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
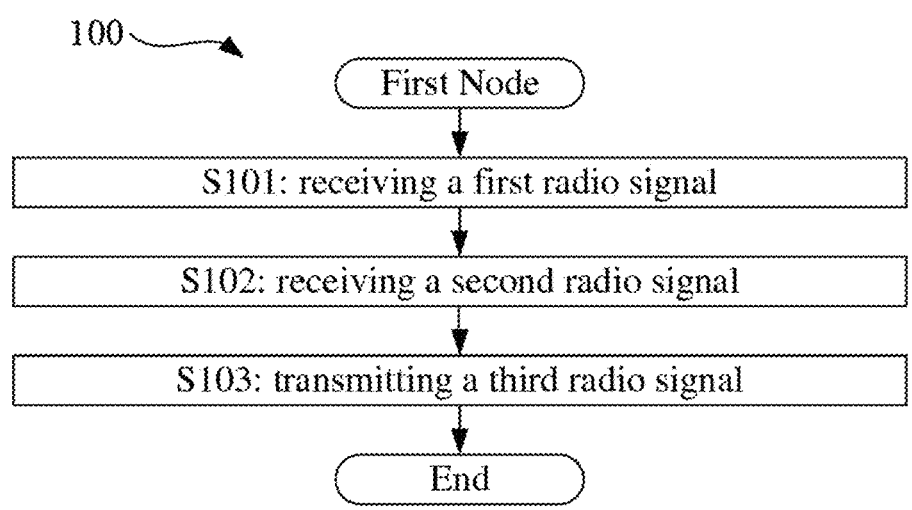
FIG. 1 is a flowchart of processing of a UE according to one embodiment of the disclosure.

Embodiment 1 illustrates an example of a flowchart of processing of one UE, as shown in FIG. 1. In 100 shown in FIG. 1, each box represents one step. In Embodiment 1, the UE receives a first radio signal in S101, receives a second radio signal in S102, and transmits a third radio signal in S103; the first radio signal is used for determining a first signature sequence, and a receiving timing of the second radio signal is used for determining a transmitting timing of the third radio signal; the first signature sequence is used for generating the third radio signal; the first radio signal and the second radio signal are associated with a first synchronization sequence and a second synchronization sequence respectively, and the first synchronization sequence is different from the second synchronization sequence.

Embodiment 2

Figure 2:
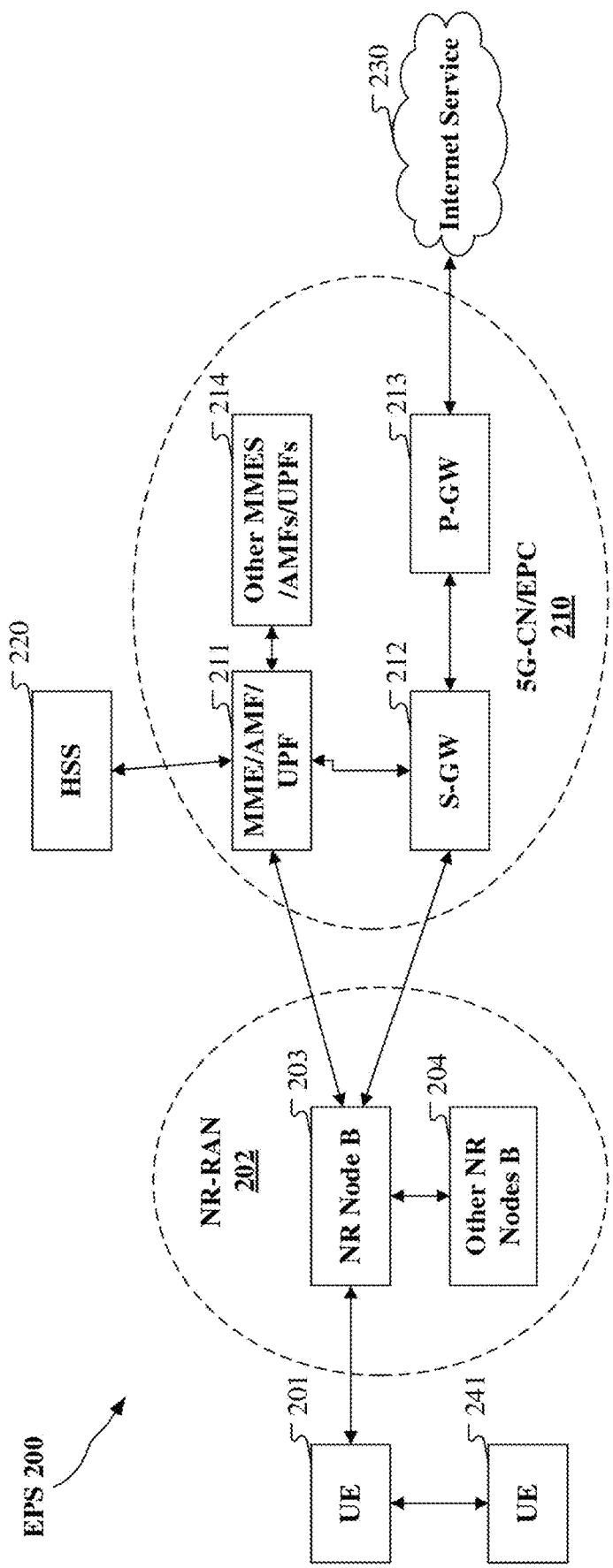
FIG. 2 is a diagram illustrating a network architecture according to one embodiment of the disclosure.

Embodiment 2 illustrates an example of a diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the UE in the disclosure.

In one embodiment, the UE 241 corresponds to the communication node in the disclosure.

In one embodiment, the gNB 203 corresponds to the base station in the disclosure.

Embodiment 3

Figure 3:
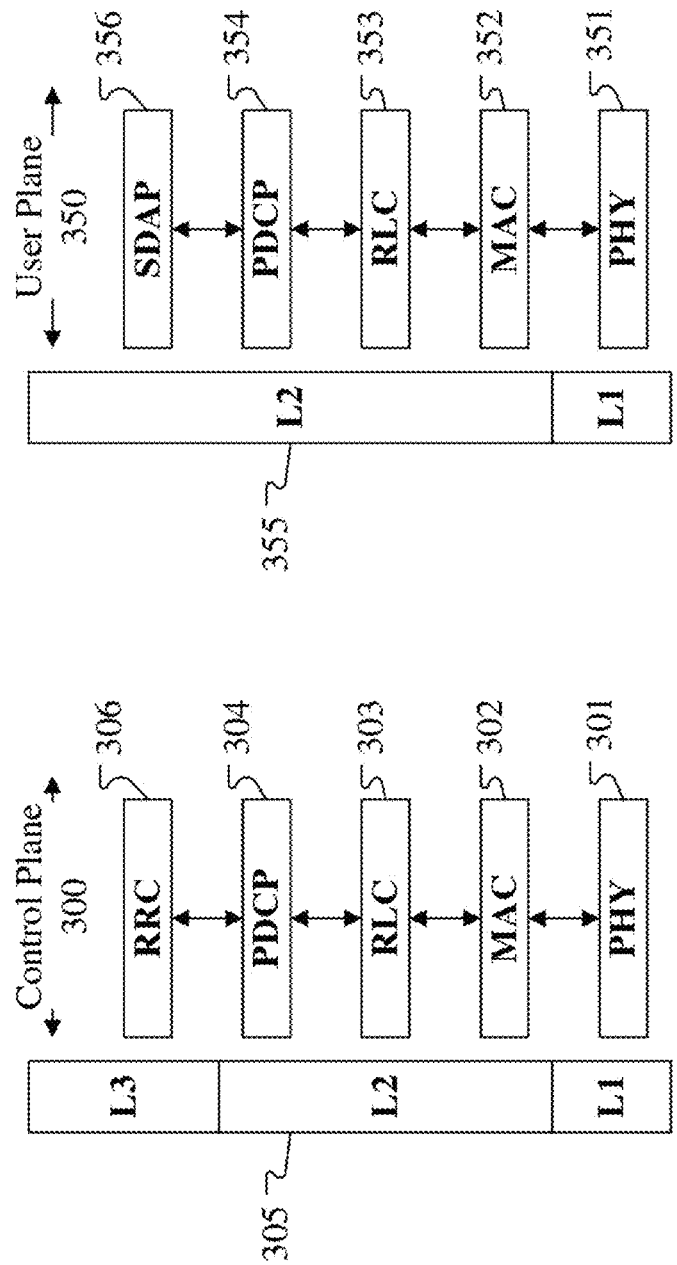
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 between a first communication node (UE, gNB or RSU in V2X) and a second communication node (gNB, UE or RSU in V2X) or between two UEs is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the first communication node and the second communication node and between two UEs over the PHY 301. The L2 layer 305 includes a Medium Access Control (MAC) sublayer 302, a Radio Link Control (RLC) sublayer 303, and a Packet Data Convergence Protocol (PDCP) sublayer 304, which are terminated at the second communication node. The PDCP sublayer 304 provides multiplexing between different radio bearers and logical channels. The PDCP sublayer 304 also provides security by encrypting packets and provides support for handover of the first communication node between the second communication nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first communication nodes. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second communication node and the first communication node. The radio protocol architecture of the user plane 350 includes a Layer 1 (L1 layer) and a Layer 2 (L2 layer); the radio protocol architecture for the first communication node and the second communication node in the user plane 350 on the PHY 351, the PDCP sublayer 354 in the L2 layer 305, the RLC sublayer 353 in the L2 layer 355 and the MAC sublayer 352 in the L2 layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first communication node may include several higher layers above the L2 layer 355, including a network layer (i.e. IP layer) terminated at the P-GW on the network side and an application layer terminated at the other end (i.e. a peer UE, a server, etc.) of the connection.

In one embodiment, the radio protocol architecture shown in FIG. 3 is applicable to the UE in the disclosure.

In one embodiment, the radio protocol architecture shown in FIG. 3 is applicable to the base station in the disclosure.

In one embodiment, the radio protocol architecture shown in FIG. 3 is applicable to the communication node in the disclosure.

Embodiment 4

Figure 4:
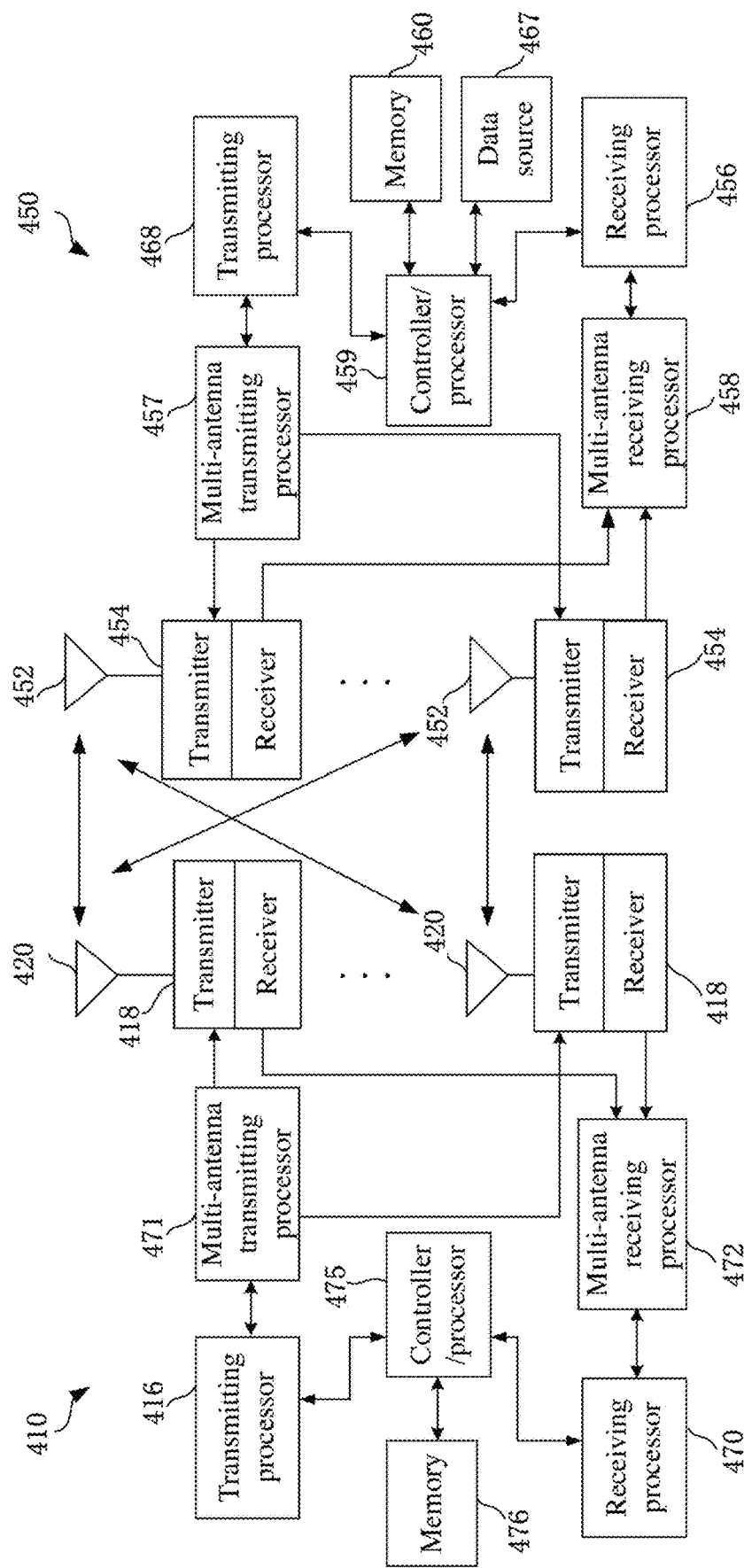
FIG. 4 is a diagram illustrating a first communication equipment and a second communication equipment according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 410 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with a transmitting analog precoding/beamforming operation. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least receives a first radio signal, receives a second radio signal and transmits a third radio signal; the first radio signal is used for determining a first signature sequence, and a receiving timing of the second radio signal is used for determining a transmitting timing of the third radio signal; the first signature sequence is used for generating the third radio signal; the first radio signal and the second radio signal are associated with a first synchronization sequence and a second synchronization sequence respectively, and the first synchronization sequence is different from the second synchronization sequence.

In one embodiment, the first communication equipment 450 includes a memory that stores a computer readable instruction program. The computer readable instruction program generates an action when executed by at least one processor. The action includes: receiving a first radio signal, receiving a second radio signal and transmitting a third radio signal; the first radio signal is used for determining a first signature sequence, and a receiving timing of the second radio signal is used for determining a transmitting timing of the third radio signal; the first signature sequence is used for generating the third radio signal; the first radio signal and the second radio signal are associated with a first synchronization sequence and a second synchronization sequence respectively, and the first synchronization sequence is different from the second synchronization sequence.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first radio signal; the first radio signal is used for determining a first signature sequence, and a receiving timing of a second radio signal is used for determining a transmitting timing of a third radio signal; the first signature sequence is used for generating the third radio signal; the first radio signal and the second radio signal are associated with a first synchronization sequence and a second synchronization sequence respectively, and the first synchronization sequence is different from the second synchronization sequence.

In one embodiment, the second communication equipment 410 includes a memory that stores a computer readable instruction program. The computer readable instruction program generates an action when executed by at least one processor. The action includes: transmitting a first radio signal; the first radio signal is used for determining a first signature sequence, and a receiving timing of a second radio signal is used for determining a transmitting timing of a third radio signal; the first signature sequence is used for generating the third radio signal; the first radio signal and the second radio signal are associated with a first synchronization sequence and a second synchronization sequence respectively, and the first synchronization sequence is different from the second synchronization sequence. In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a second radio signal; a receiving timing of the second radio signal is used for determining a transmitting timing of a third radio signal; a first signature sequence is used for generating the third radio signal; a first radio signal is used for determining the first signature sequence; the first radio signal and the second radio signal are associated with a first synchronization sequence and a second synchronization sequence respectively, and the first synchronization sequence is different from the second synchronization sequence.

In one embodiment, the second communication equipment 410 includes a memory that stores a computer readable instruction program. The computer readable instruction program generates an action when executed by at least one processor. The action includes: transmitting a second radio signal; a receiving timing of the second radio signal is used for determining a transmitting timing of a third radio signal; a first signature sequence is used for generating the third radio signal; a first radio signal is used for determining the first signature sequence; the first radio signal and the second radio signal are associated with a first synchronization sequence and a second synchronization sequence respectively, and the first synchronization sequence is different from the second synchronization sequence.

In one embodiment, the first communication equipment 450 corresponds to the UE in the disclosure.

In one embodiment, the second communication equipment 410 corresponds to the base station in the disclosure.

In one embodiment, the second communication equipment 410 corresponds to the communication node in the disclosure.

In one embodiment, the first communication equipment 450 is one UE.

In one embodiment, the second communication equipment 410 is one base station.

In one embodiment, the second communication equipment 410 is one communication node.

In one embodiment, at least one of the antenna 452, the receiver 454, the multi-antenna receiving processor 458, the receiving processor 456 and the controller/processor 459 is used for receiving a first radio signal; and at least one of the antenna 420, the transmitter 418, the multi-antenna transmitting processor 471, the transmitting processor 416 and the controller/processor 475 is used for transmitting a first radio signal.

In one embodiment, at least one of the antenna 452, the receiver 454, the multi-antenna receiving processor 458, the receiving processor 456 and the controller/processor 459 is used for receiving a second radio signal; and at least one of the antenna 420, the transmitter 418, the multi-antenna transmitting processor 471, the transmitting processor 416 and the controller/processor 475 is used for transmitting a second radio signal.

In one embodiment, at least one of the antenna 452, the transmitter 454, the multi-antenna transmitting processor 457, the transmitting processor 468 and the controller/processor 459 is used for transmitting a third radio signal; and at least one of the antenna 420, the receiver 418, the multi-antenna receiving processor 472, the receiving processor 470 and the controller/processor 475 is used for receiving a third radio signal.

In one embodiment, at least one of the antenna 452, the receiver 454, the multi-antenna receiving processor 458, the receiving processor 456 and the controller/processor 459 is used for monitoring K downlink signalings; and at least one of the antenna 420, the transmitter 418, the multi-antenna transmitting processor 471, the transmitting processor 416 and the controller/processor 475 is used for transmitting K downlink signalings.

In one embodiment, at least one of the antenna 452, the receiver 454, the multi-antenna receiving processor 458, the receiving processor 456 and the controller/processor 459 is used for monitoring a first signaling; and at least one of the antenna 420, the transmitter 418, the multi-antenna transmitting processor 471, the transmitting processor 416 and the controller/processor 475 is used for transmitting a first signaling.

In one embodiment, at least one of the antenna 452, the transmitter 454, the multi-antenna transmitting processor 457, the transmitting processor 468 and the controller/processor 459 is used for transmitting a fourth radio signal; and at least one of the antenna 420, the receiver 418, the multi-antenna receiving processor 472, the receiving processor 470 and the controller/processor 475 is used for receiving a fourth radio signal.

In one embodiment, at least one of the antenna 452, the receiver 454, the multi-antenna receiving processor 458, the receiving processor 456 and the controller/processor 459 is used for receiving a second signaling; and at least one of the antenna 420, the transmitter 418, the multi-antenna transmitting processor 471, the transmitting processor 416 and the controller/processor 475 is used for transmitting a second signaling.

In one embodiment, at least one of the antenna 452, the transmitter 454, the multi-antenna transmitting processor 457, the transmitting processor 468 and the controller/processor 459 is used for transmitting a fifth radio signal; and at least one of the antenna 420, the receiver 418, the multi-antenna receiving processor 472, the receiving processor 470 and the controller/processor 475 is used for receiving a fifth radio signal.

Embodiment 5

Figure 5:
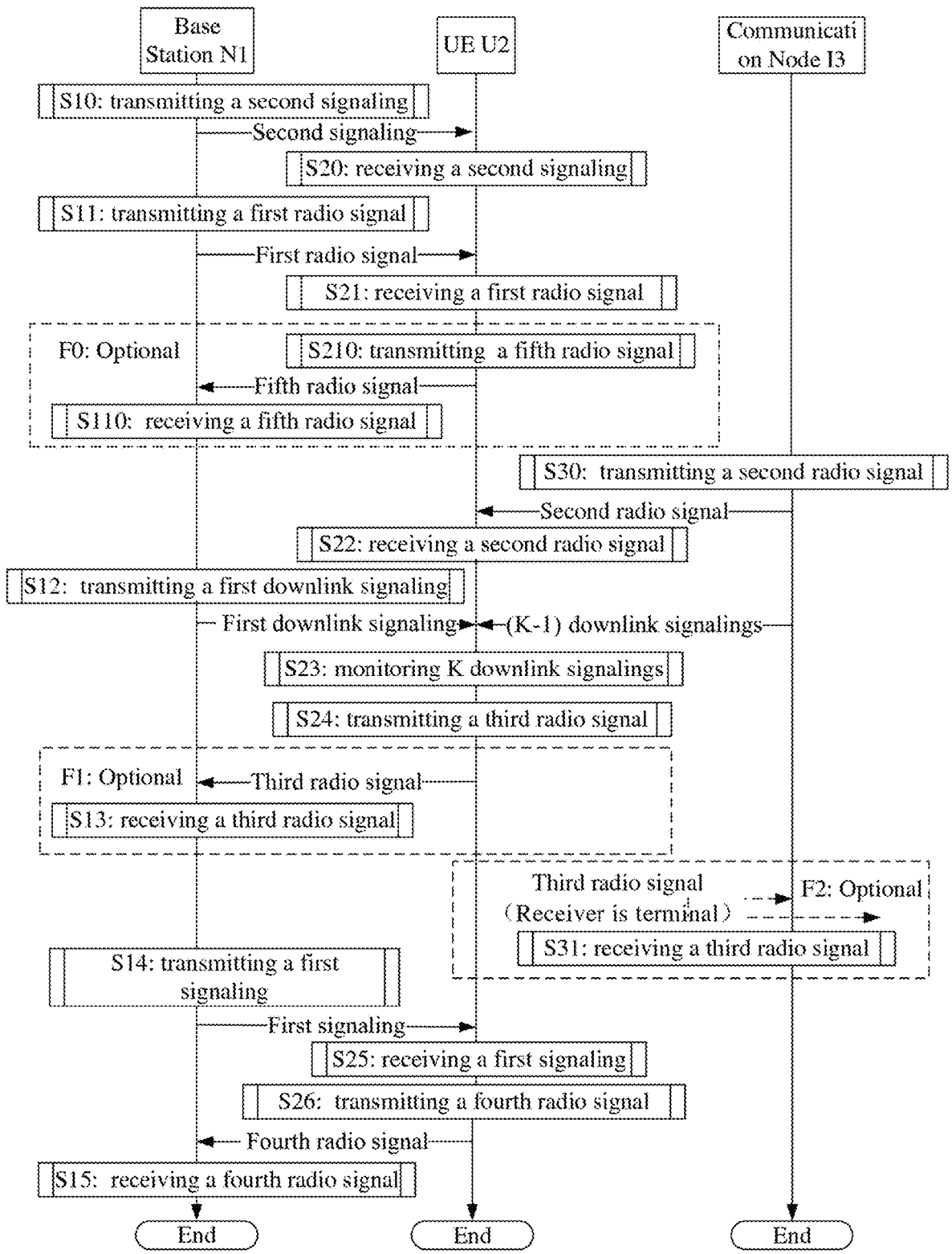
FIG. 5 is a flowchart of transmission of a first radio signal according to one embodiment of the disclosure.

Embodiment 5 illustrates an example of a flowchart of transmission of a first radio signal according to the disclosure, as shown in FIG. 1. In FIG. 1, a base station N1 is a maintenance base station for a serving cell of a UE U2, and a communication node I3 is a device taken as a synchronization reference by the UE U2. In FIG. 5, steps in boxes F0, F1 and F2 are optional.

The base station N1 transmits a second signaling in S10, transmits a first radio signal in S11, receives a fifth radio signal in S110, transmits a first downlink signaling in S12, receives a third radio signal in S13, transmits a first signaling in S14 and receives a fourth radio signal in S15.

The UE U2 receives a second signaling in S20, receives a first radio signal in S21, transmits a fifth radio signal in S210, receives a second radio signal in S22, monitors K downlink signalings in S23, transmits a third radio signal in S24, receives a first signaling in S25 and transmits a fourth radio signal in S26.

The communication node I3 transmits a second radio signal in S30 and receives a third radio signal in S31.

Embodiment 1, the first radio signal is used for determining a first signature sequence, and a receiving timing of the second radio signal is used for determining a transmitting timing of the third radio signal; the first signature sequence is used for generating the third radio signal. The first radio signal and the second radio signal are associated with a first synchronization sequence and a second synchronization sequence respectively, and the first synchronization sequence is different from the second synchronization sequence. The downlink signaling is a physical layer signaling, and the K downlink signalings are associated with K synchronization sequences respectively. Any two of the K synchronization sequences are different. The K is a positive integer greater than 1. The second synchronization sequence is one of the K synchronization sequences. The K downlink signalings are identified by a first index respectively, and the first index is an integer. The first synchronization sequence is one of the K synchronization sequences, and the UE U2 assumes that only the first synchronization sequence among the K synchronization sequences is associated with the first signaling. A format of the first signaling is any one candidate format in a format set. The format set includes a positive integer number of candidate formats. The first signaling is used for determining scheduling information of the fourth radio signal and the scheduling information includes at least one of occupied time-domain resources, occupied frequency-domain resources, an MCS, an NDI, an RV, or a HARQ process number. The second signaling is used for determining K time-frequency resource sets or the K synchronization sequences or both. The second signaling is associated with the first synchronization sequence. The first radio signal indicates a first identifier, and the first identifier is used for generating the first signature sequence. A receiving timing of the first radio signal is used for determining a transmitting timing of the fifth radio signal, and the first signature sequence is used for generating the fifth radio signal. The downlink signaling is used for at least one of TPC, triggering the UE U2 to transmit a reference signal, or triggering the UE U2 to transmit channel state information.

In one subembodiment, the K downlink signalings include (K−1) downlink signalings shown in FIG. 5 and the first downlink signaling.

In one subembodiment, a transmission channel corresponding to the third radio signal is an Uplink Shared Channel (UL-SCH).

In one subembodiment, a transmission channel corresponding to the third radio signal is a Sidelink Shared Channel (SL-SCH).

In one subembodiment, a transmission channel corresponding to the third radio signal is a Sidelink Discovery Channel (SL-DCH).

In one subembodiment, a transmission channel corresponding to the third radio signal is a Sidelink Broadcast Channel (SL-BCH).

In one subembodiment, the second signaling is semi-statically configured.

In one subembodiment, the communication node I3 is a ground device used by the UE U2 to position.

In one subembodiment, the communication node I3 is a GNSS.

In one subembodiment, the communication node I3 includes one or more satellites.

In one subembodiment, the communication node I3 is one cell, and the K downlink signalings include one given downlink signal which is transmitted by the communication node I3.

In one affiliated embodiment of the above subembodiment, the communication node I3 is further used for monitoring the third radio signal.

In one subembodiment, a receiver of the third radio signal includes a node other than the base station N1 and the communication node I3.

Embodiment 6

Figure 6:
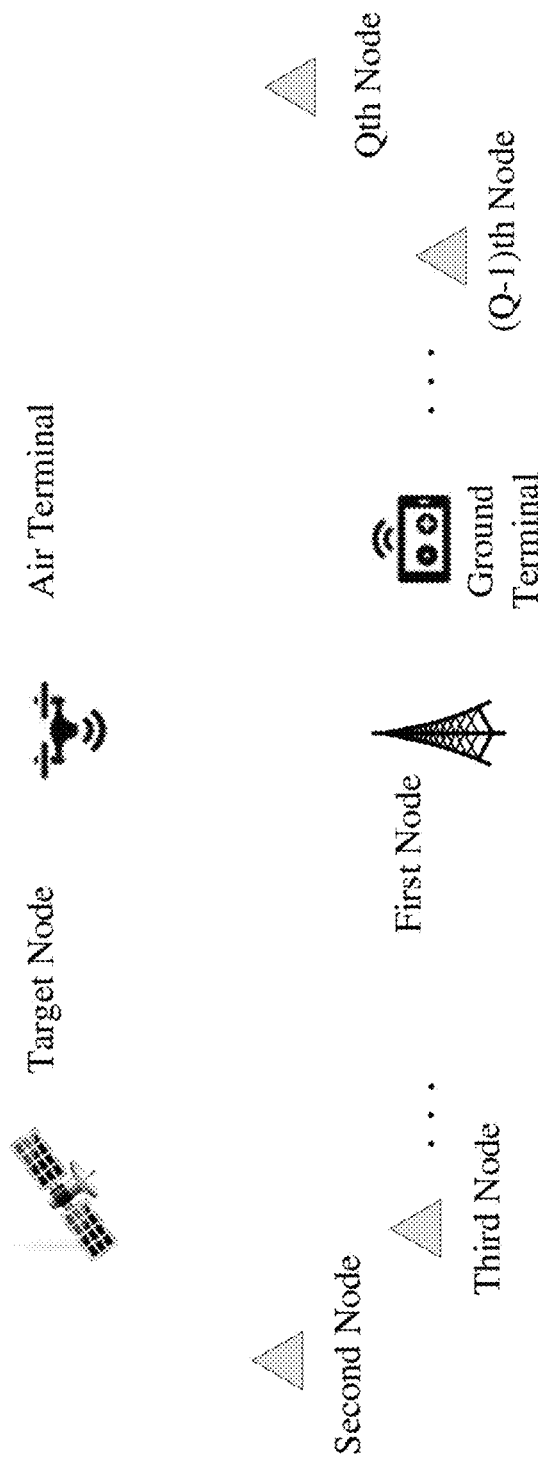
FIG. 6 is a diagram illustrating an application scenario according to one embodiment of the disclosure.

Embodiment 6 illustrates an example of a diagram of one application scenario according to the disclosure, as shown in FIG. 6. An air terminal shown in FIG. 6 corresponds to the UE in the disclosure. A first node to a Qth node shown in FIG. 6 are Q ground devices, the Q being a positive integer greater than 1. A ground terminal shown in FIG. 6 is an opposite-end terminal of the air terminal. A target node shown in FIG. 6 is one or more satellites, or the target node shown in FIG. 6 is a GNSS.

In one subembodiment, the first node is a serving cell of the air terminal.

In one subembodiment, the first node is a serving cell of the ground terminal.

In one subembodiment, the air terminal and the ground terminal belong to one D2D pair.

In one subembodiment, the air terminal is a transmitter of the third radio signal in the disclosure.

In one affiliated embodiment of the above subembodiment, a receiver of the third radio signal includes the first node.

In one affiliated embodiment of the above subembodiment, a receiver of the third radio signal includes a first given node, and the first given node is one of the second node to the Qth node shown in FIG. 6.

In one affiliated embodiment of the above subembodiment, a receiver of the third radio signal includes the ground terminal.

In one subembodiment, the first node transmits the first downlink signaling in the disclosure, and the third radio signal is triggered by the first downlink signaling.

In one subembodiment, a given downlink signaling is used for triggering the third radio signal, the given downlink signaling is a downlink signaling among the K downlink signalings in the disclosure other than the first downlink signaling, and a transmitter of the given downlink signaling is one of the second node to the Qth node.

In one subembodiment, the Q is equal to the K in the disclosure, and the first node to the Qth node transmit the K downlink signalings in the disclosure respectively.

In one subembodiment, the Q is equal to a summation of the K and 1, and the first node to the Qth node and the ground terminal transmit the K downlink signalings in the disclosure respectively.

In one subembodiment, the first node transmits the first radio signal in the disclosure, and the target node transmits the second radio signal in the disclosure.

In one affiliated embodiment of the above subembodiment, the first radio signal indicates explicitly the first identifier in the disclosure, and the first identifier is used for generating the first signature sequence in the disclosure.

In one subembodiment, the first node transmits the second radio signal in the disclosure, and the target node transmits the first radio signal in the disclosure.

In one affiliated embodiment of the above subembodiment, the first identifier in the disclosure is equal to Y, the Y is a predefined integer, and the first identifier is used for generating the first signature sequence in the disclosure.

In an example of the above affiliated embodiment, the Y is equal to 0.

Embodiment 7

Figure 7:
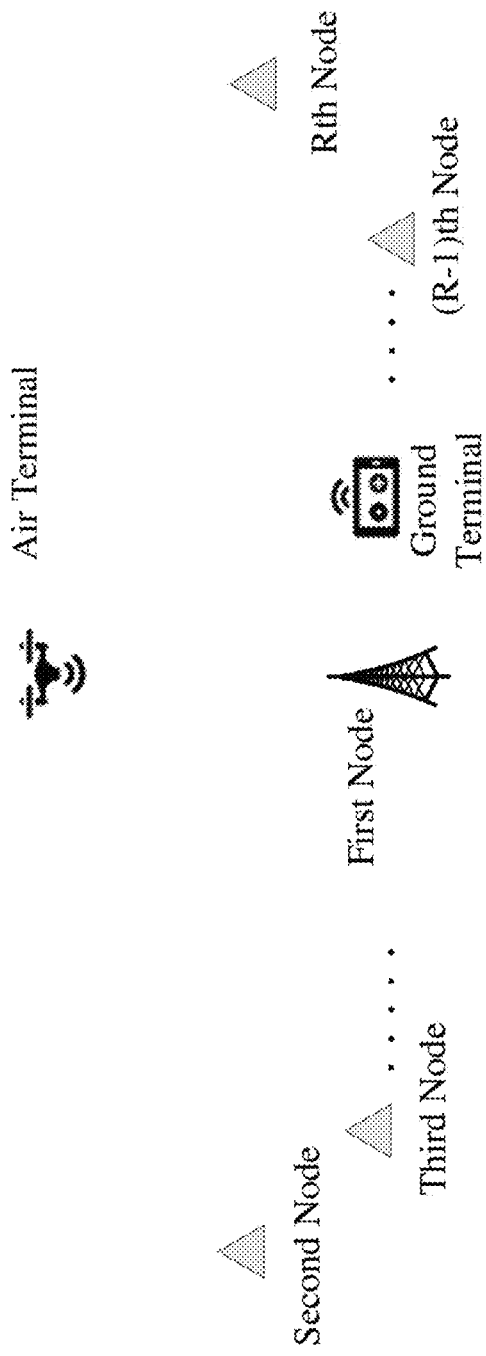
FIG. 7 is a diagram illustrating an application scenario according to another embodiment of the disclosure.

Embodiment 7 illustrates an example of a diagram of one application scenario according to the disclosure, as shown in FIG. 7. An air terminal shown in FIG. 7 corresponds to the UE in the disclosure. A first node to an Rth node shown in FIG. 7 are R ground devices, the R being a positive integer greater than 1. A ground terminal shown in FIG. 7 is an opposite-end terminal of the air terminal.

In one subembodiment, the first node is a serving cell of the air terminal.

In one subembodiment, the first node is a serving cell of the ground terminal.

In one subembodiment, the air terminal and the ground terminal belong to one D2D pair.

In one subembodiment, the air terminal is a transmitter of the third radio signal in the disclosure.

In one affiliated embodiment of the above subembodiment, a receiver of the third radio signal includes the first node.

In one affiliated embodiment of the above subembodiment, a receiver of the third radio signal includes a second given node, and the second given node is one of the second node to the Rth node shown in FIG. 7.

In one affiliated embodiment of the above subembodiment, a receiver of the third radio signal includes the ground terminal.

In one subembodiment, the first node transmits the first downlink signaling in the disclosure, and the third radio signal is triggered by the first downlink signaling.

In one subembodiment, a given downlink signaling is used for triggering the third radio signal, the given downlink signaling is a downlink signaling among the K downlink signaling in the disclosure other than the first downlink signaling, and a transmitter of the given downlink signaling is one of the second node to the Rth node.

In one subembodiment, the R is equal to the K in the disclosure, and the first node to the Rth node transmit the K downlink signalings in the disclosure respectively.

In one subembodiment, the R is equal to a summation of the K and 1, and the first node to the Rth node and the ground terminal transmit the K downlink signalings in the disclosure respectively.

In one subembodiment, the first node transmits the first radio signal in the disclosure, and one of the second node to the Rth node transmits the second radio signal in the disclosure.

In one subembodiment, the first node transmits the second radio signal in the disclosure, and one of the second node to the Rth node transmits the first radio signal in the disclosure.

In one affiliated embodiment of the above subembodiment, the first radio signal indicates explicitly the first identifier in the disclosure, and the first identifier is used for generating the first signature sequence in the disclosure.

In one subembodiment, the first node transmits the second radio signal in the disclosure, and the ground terminal transmits the first radio signal in the disclosure.

In one affiliated embodiment of the above subembodiment, the first identifier in the disclosure is equal to a second identifier, the second identifier is used for generating a second signature sequence, the second signature sequence is used for generating the first radio signal, and the first identifier is used for generating the first signature sequence in the disclosure.

In an example of the above affiliated embodiment, the second identifier is equal to 169, and a synchronization source of the ground terminal is a GNSS.

In an example of the above affiliated embodiment, the second identifier belongs to a second identifier set, the second identifier set is predefined, and the ground terminal selects the second identifier from the second identifier set autonomously.

In a dependent embodiment of the above example, the second identifier is a positive integer not less than 168 but not greater than 335.

In a dependent embodiment of the above example, the ground terminal is Out Of Coverage (OOC).

Embodiment 8

Figure 8:
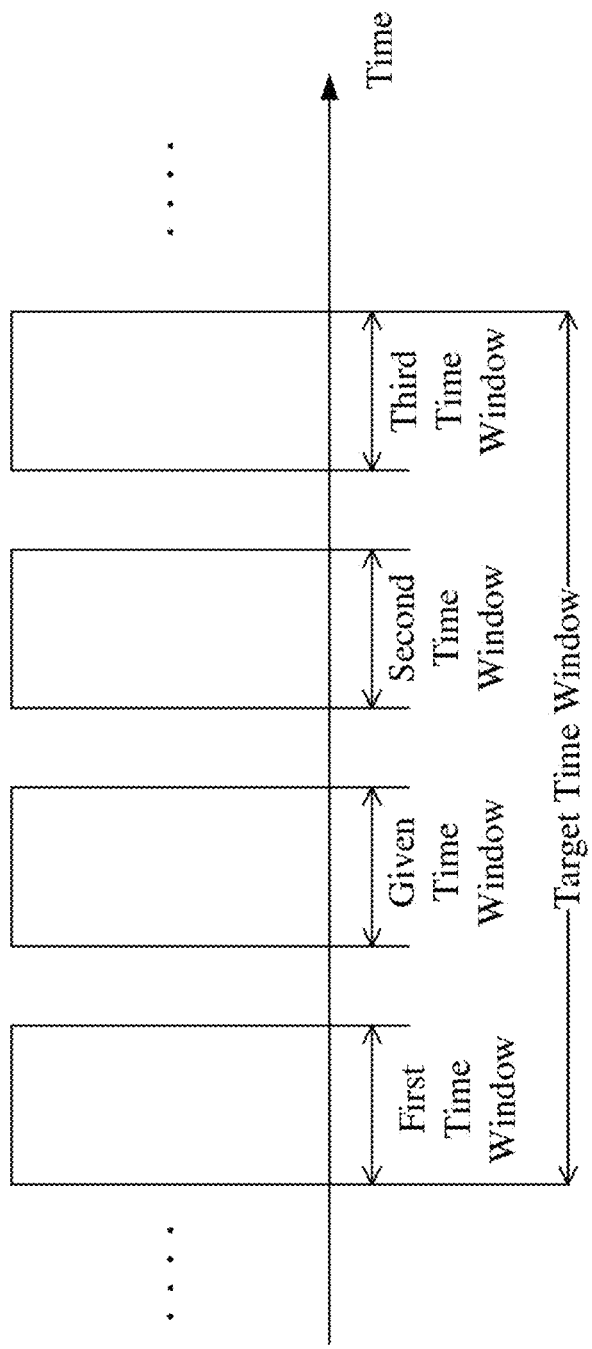
FIG. 8 is a diagram illustrating a time sequence of a first radio signal and a second radio signal according to one embodiment of the disclosure.

Embodiment 8 illustrates a diagram of a time sequence of a first radio signal and a second radio signal, as shown in FIG. 8. In FIG. 8, a first time window is used for transmitting the first radio signal in the disclosure, a second time window is used for transmitting the second radio signal in the disclosure, and a third time window is used for transmitting the third radio signal in the disclosure. The UE in the disclosure further transmits a fifth radio signal in a given time window shown in FIG. 8. The first time window, the second time window, the third time window and the given time window all belong to a target time window.

In one subembodiment, the first radio signal is used for determining a first signature sequence, and the UE keeps the first signature sequence unchanged in the target time window.

In one subembodiment, a transmitter of the third radio signal transmits a fifth radio signal in the first time window, the first radio signal is used for determining a first signature sequence, and the first signature sequence is used for generating the fifth radio signal, and a receiving timing of the first radio signal is used for determining a transmitting timing of the fifth radio signal.

In one affiliated embodiment of the above subembodiment, the phrase that a receiving timing of the first radio signal is used for determining a transmitting timing of the fifth radio signal refers that: the UE selects a transmitter of the first radio signal as a synchronization reference source.

In one affiliated embodiment of the above subembodiment, the phrase that a receiving timing of the first radio signal is used for determining a transmitting timing of the fifth radio signal refers that: the UE selects a transmitter of the first radio signal as a synchronization reference source, and employs the first radio signal as a timing reference of the fifth radio signal.

Embodiment 9

Figure 9:
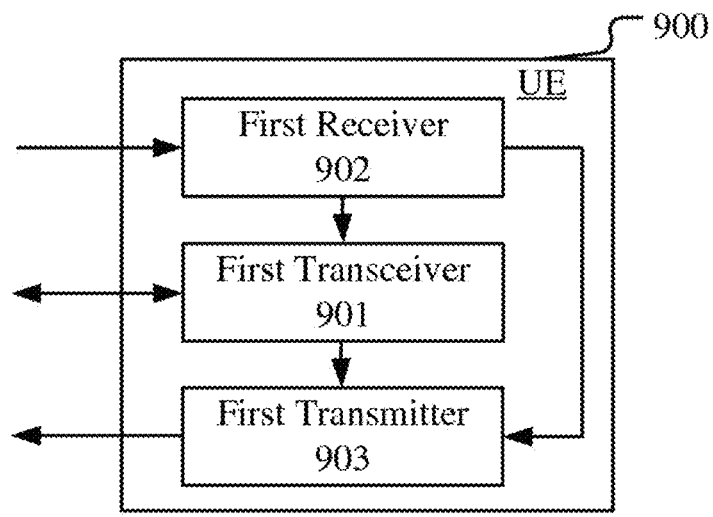
FIG. 9 is a structure block diagram illustrating a processing device in a UE according to one embodiment of the disclosure.

Embodiment 9 illustrates an example of a structure block diagram of a processing device in a UE, as shown in FIG. 9. In FIG. 9, the processing device 900 in the UE includes a first transceiver 901, a first receiver 902 and a first transmitter 903.

The first transceiver 901 receives a first radio signal.

The first receiver 902 receives a second radio signal.

The first transmitter 903 transmits a third radio signal.

In Embodiment 9, the first radio signal is used for determining a first signature sequence, and a receiving timing of the second radio signal is used for determining a transmitting timing of the third radio signal. The first signature sequence is used for generating the third radio signal. The first radio signal and the second radio signal are associated with a first synchronization sequence and a second synchronization sequence respectively, and the first synchronization sequence is different from the second synchronization sequence.

In one subembodiment, the first transceiver 901 further monitors K downlink signalings. The downlink signaling is a physical layer signaling, and the K downlink signalings are associated with K synchronization sequences respectively. Any two of the K synchronization sequences are different. The K is a positive integer greater than 1. The second synchronization sequence is one of the K synchronization sequences. The K downlink signalings are identified by a first index respectively, and the first index is an integer.

In one subembodiment, the first transceiver 901 monitors a first signaling. The first synchronization sequence is one of the K synchronization sequences, and the UE assumes that only the first synchronization sequence among the K synchronization sequences is associated with the first signaling. A format of the first signaling is any one candidate format in a format set. The format set includes a positive integer number of candidate formats.

In one subembodiment, the first transceiver 901 further transmits a fourth radio signal. The first signaling is used for determining scheduling information of the fourth radio signal; and the scheduling information includes at least one of occupied time-domain resources, occupied frequency-domain resources, an MCS, an NDI, an RV, or a HARQ process number.

In one subembodiment, the first transceiver 901 further receives a second signaling. The second signaling is used for determining K time-frequency resource sets or the K synchronization sequences or both. The second signaling is associated with the first synchronization sequence. The first radio signal indicates a first identifier, and the first identifier is used for generating the first signature sequence.

In one subembodiment, the first transceiver 901 further transmits a fifth radio signal. A receiving timing of the first radio signal is used for determining a transmitting timing of the fifth radio signal, and the first signature sequence is used for generating the fifth radio signal.

In one subembodiment, the downlink signaling is used for at least one of TPC, triggering the UE to transmit a reference signal, or triggering the UE to transmit channel state information.

In one subembodiment, the first receiver 902 belongs to the first transceiver 901.

In one embodiment, the first transceiver 901 includes at least the former six of the antenna 452, the receiver/transmitter 454, the multi-antenna receiving processor 458, the receiving processor 456, the multi-antenna transmitting processor 457, the transmitting processor 468 and the controller/processor 459 illustrated in Embodiment 4.

In one embodiment, the first receiver 902 includes at least the former four of the antenna 452, the receiver 454, the multi-antenna receiving processor 458, the receiving processor 456 and the controller/processor 459 illustrated in Embodiment 4.

In one embodiment, the first transmitter 903 includes at least the former four of the antenna 452, the transmitter 454, the multi-antenna transmitting processor 457, the transmitting processor 468 and the controller/processor 459 illustrated in Embodiment 4.

Embodiment 10

Figure 10:
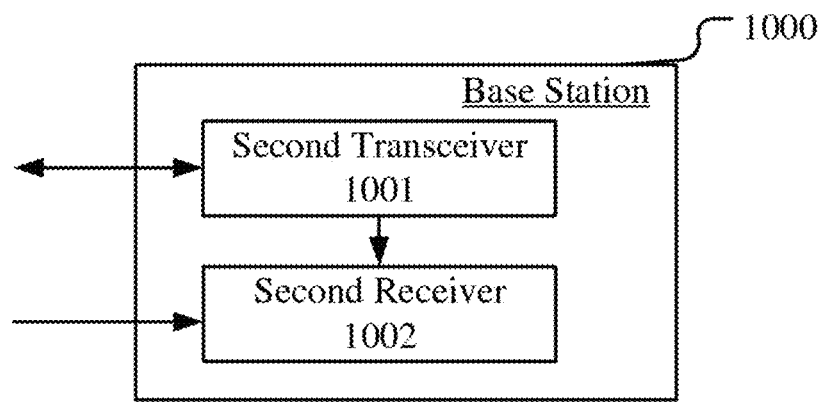
FIG. 10 is a structure block diagram illustrating a processing device in a base station according to one embodiment of the disclosure.

Embodiment 10 illustrates an example of a structure block diagram of a processing device in a base station, as shown in FIG. 10. In FIG. 10, the processing device 1000 in the base station includes a second transceiver 1001 and a second receiver 1002.

The second transceiver 1001 transmits a first radio signal. The second receiver 1002 receives a third radio signal.

In Embodiment 10, the first radio signal is used for determining a first signature sequence, and a receiving timing of a second radio signal is used for determining a transmitting timing of a third radio signal. The first signature sequence is used for generating the third radio signal. The first radio signal and the second radio signal are associated with a first synchronization sequence and a second synchronization sequence respectively, and the first synchronization sequence is different from the second synchronization sequence.

In one subembodiment, the second transceiver 1001 further transmits a first downlink signaling. The first downlink signaling is a physical layer signaling, and K downlink signalings are associated with K synchronization sequences respectively. Any two of the K synchronization sequences are different. The K is a positive integer greater than 1. The second synchronization sequence is one of the K synchronization sequences. The K downlink signalings are identified by a first index respectively, and the first index is an integer. The first downlink signaling is one of the K downlink signalings.

In one subembodiment, the second transceiver 1001 further transmits a first signaling. The first synchronization sequence is one of the K synchronization sequences, and only the first synchronization sequence among the K synchronization sequences is associated with the first signaling. A format of the first signaling is any one candidate format in a format set. The format set includes a positive integer number of candidate formats.

In one subembodiment, the second transceiver 1001 further receives a fourth radio signal. The first signaling is used for determining scheduling information of the fourth radio signal; and the scheduling information includes at least one of occupied time-domain resources, occupied frequency-domain resources, an MCS, an NDI, an RV, or a HARQ process number.

In one subembodiment, the second transceiver 1001 further transmits a second signaling. The second signaling is used for determining K time-frequency resource sets or the K synchronization sequences or both. The second signaling is associated with the first synchronization sequence. The first radio signal indicates a first identifier, and the first identifier is used for generating the first signature sequence.

In one subembodiment, the second transceiver 1001 further receives a fifth radio signal. A receiving timing of the first radio signal is used for determining a transmitting timing of the fifth radio signal, and the first signature sequence is used for generating the fifth radio signal.

In one subembodiment, the downlink signaling is used for at least one of TPC, triggering a transmitter of the third radio signal to transmit a reference signal, or triggering a transmitter of the third radio signal to transmit channel state information.

In one embodiment, the second transceiver 1001 includes at least the former six of the antenna 420, the transmitter/receiver 418, the multi-antenna transmitting processor 471, the multi-antenna receiving processor 472, the transmitting processor 416, the receiving processor 470 and the controller/processor 475.

In one embodiment, the second receiver 1002 includes at least the former four of the antenna 420, the receiver 418, the multi-antenna receiving processor 472, the receiving processor 470 and the controller/processor 475.

Embodiment 11

Figure 11:
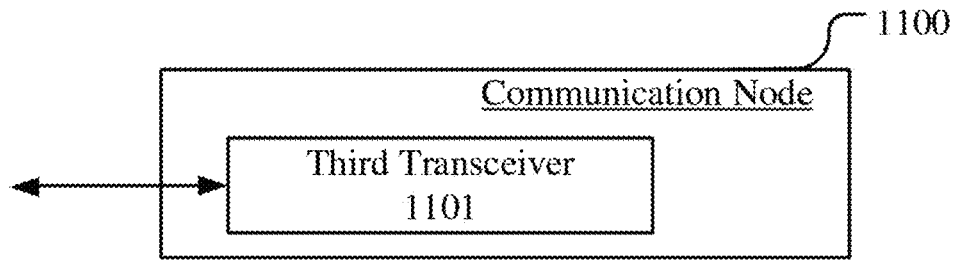
FIG. 11 is a structure block diagram illustrating a processing device in a communication node according to one embodiment of the disclosure.

Embodiment 11 illustrates an example of a structure block diagram of a processing device in a communication node, as shown in FIG. 11. In FIG. 11, the processing device 1100 in the communication node includes a third transceiver 1101.

The third transceiver 1101 transmits a second radio signal.

In Embodiment 11, a receiving timing of the second radio signal is used for determining a transmitting timing of a third radio signal. A first signature sequence is used for generating the third radio signal. A first radio signal is used for determining the first signature sequence. The first radio signal and the second radio signal are associated with a first synchronization sequence and a second synchronization sequence respectively, and the first synchronization sequence is different from the second synchronization sequence.

In one subembodiment, the third transceiver 1101 further receives a third radio signal In one subembodiment, the communication node processing device 300 is a GNSS.

In one subembodiment, the communication node processing device 300 includes one or more satellites.

In one subembodiment, the second radio signal is a GPS signal.

In one subembodiment, the communication node processing device 300 is one cell.

In one subembodiment, the communication node processing device 300 is one terminal.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a user equipment for wireless communication, comprising:
   receiving a first radio signal from a serving cell corresponding to the user equipment;
   receiving a second radio signal from a communication node different from the serving cell;
   monitors K downlink signalings, wherein the downlink signaling is a physical layer signaling, and the K downlink signalings are associated with K synchronization sequences respectively; any two of the K synchronization sequences are different the K is a positive integer greater than 1; the second synchronization sequence is one of the K synchronization sequences; the K downlink signalings are identified by a first index respectively, and the first index is an integer;
   determining a first signature sequence based on the first radio signal;
   generating a third radio signal based on the first signature sequence;
   determining a transmitting timing of the third radio signal based on a receiving timing of the second radio signal;
   transmitting the third radio signal; wherein:
   the first radio signal and the second radio signal are associated with a first synchronization sequence and a second synchronization sequence respectively;
   the first synchronization sequence is different from the second synchronization sequence;
   the serving cell is associated with the first synchronization sequence; and
   the communication node is associated with the second synchronization sequence.

2. A user equipment for wireless communication, comprising:
   a first transceiver, configured to receive a first radio signal and monitors K downlink signalings, wherein the downlink signaling is a physical layer signaling, and the K downlink signalings are associated with K synchronization sequences respectively; any two of the K synchronization sequences are different the K is a positive integer greater than 1; the second synchronization sequence is one of the K synchronization sequences; the K downlink signalings are identified by a first index respectively, and the first index is an integer;
   a first receiver, configured to receive a second radio signal; and
   a first transmitter, configured to transmit a third radio signal;
   a memory device, storing a computer readable instruction program; and
   a processor, connected to the first transceiver, the first receiver, the first transmitter, and the memory, executing the computer readable instruction program to: determine a first signature sequence using the first radio signal, determine a transmitting timing of the third radio signal using a receiving timing of the second radio signal, and generate the third radio signal using the first signature sequence; wherein:
   the first radio signal and the second radio signal are associated with a first synchronization sequence and a second synchronization sequence respectively;
   the first synchronization sequence is different from the second synchronization sequence;
   the first synchronization sequence is associated with a serving cell corresponding to the user equipment;
   the second synchronization sequence is associated with a communication node different from the serving cell; and
   the first radio signal and the second radio signal are transmitted by the serving cell and the communication node, respectively.

3. The user equipment according to claim 2, wherein the first transceiver monitors a first signaling; wherein the first synchronization sequence is one of the K synchronization sequences, and the user equipment assumes that only the first synchronization sequence among the K synchronization sequences is associated with the first signaling; a format of the first signaling is any one candidate format in a format set; and the format set comprises a positive integer number of candidate formats.

4. The user equipment according to claim 3, wherein the first transceiver transmits a fourth radio signal; the first signaling is used for determining scheduling information of the fourth radio signal; and the scheduling information comprises at least one of occupied time-domain resources, occupied frequency-domain resources, a Modulation and Coding Status, a New Data Indicator, a Redundancy Version, or a Hybrid Automatic Repeat reQuest process number.

5. The user equipment according to claim 2, wherein the first transceiver receives a second signaling; wherein the second signaling is used for determining K time-frequency resource sets or the K synchronization sequences or both; the second signaling is associated with the first synchronization sequence; the first radio signal indicates a first identifier, and the first identifier is used for generating the first signature sequence.

6. The user equipment according to claim 2, wherein the first transceiver transmits a fifth radio signal; wherein a receiving timing of the first radio signal is used for determining a transmitting timing of the fifth radio signal, and the first signature sequence is used for generating the fifth radio signal.

7. The user equipment according to claim 2, wherein the downlink signaling is used for at least one of Transmission Power Control, triggering the user equipment to transmit a reference signal, or triggering the user equipment to transmit channel state information.

8. A communication node for wireless communication, comprising:
- a transceiver;
- a memory device, storing a computer readable instruction program; and
- a processor, connected to the transceiver and the memory device, executing the computer readable instruction program to configure the transceiver to transmit a second radio signal and one of K downlink signalings to a user equipment and receive a third radio signal from the user equipment; wherein:
- a receiving timing of the second radio signal is used for determining a transmitting timing of the third radio signal;
- a first signature sequence is used for generating the third radio signal;
- a first radio signal transmitted from a base station is used for determining the first signature sequence;
- the downlink signaling is a physical layer signaling, and the K downlink signalings are associated with K synchronization sequences respectively; any two of the K synchronization sequences are different the K is a positive integer greater than 1; the second synchronization sequence is one of the K synchronization sequences; the K downlink signalings are identified by a first index respectively, and the first index is an integer;
- the first radio signal and the second radio signal are associated with a first synchronization sequence and a second synchronization sequence respectively, and the first synchronization sequence is different from the second synchronization sequence;
- the base station is associated with the first synchronization sequence;
- the communication node is associated with the second synchronization sequence;
- the base station is a serving cell corresponding to the user equipment; and
- the communication node device is different from the base station.

* * * * *